(12) United States Patent  
Liu (10) Patent No.: US 9,129,612 B2  
(45) Date of Patent: *Sep. 8, 2015

(54) SIX-DIMENSIONAL OPTICAL MULTILAYER STORAGE USING TWO-PHOTON ABSORPTION WRITING, ERASING AND OPTICAL COHERENCE TOMOGRAPHY READING

(71) Applicant: Shangqing Liu, Toronto (CA)

(72) Inventor: Shangqing Liu, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,198

(22) Filed: Jul. 22, 2014

(65) Prior Publication Data

US 2015/0063089 A1   Mar. 5, 2015

Related U.S. Application Data

(60) Provisional application No. 61/866,203, filed on Aug. 15, 2013.

(51) Int. Cl.
*G11B 7/0065* (2006.01)
*G11B 7/1362* (2012.01)
*G11B 7/0045* (2006.01)

(52) U.S. Cl.
CPC ............ *G11B 7/0065* (2013.01); *G11B 7/1362* (2013.01); *G11B 2007/00457* (2013.01); *G11B 2007/00656* (2013.01)

(58) Field of Classification Search
None
See application file for complete search history.

(56) References Cited

U.S. PATENT DOCUMENTS

| 5,777,760 | A | * | 7/1998 | Hays et al. | 359/7 |
| 6,072,765 | A | * | 6/2000 | Rolland et al. | 369/128 |
| 8,503,279 | B2 | * | 8/2013 | Liu | 369/109.01 |
| 2010/0103796 | A1 | * | 4/2010 | Suto et al. | 369/103 |
| 2010/0321748 | A1 | * | 12/2010 | Gladney et al. | 359/7 |

* cited by examiner

*Primary Examiner* — Wayne Young  
*Assistant Examiner* — Brian Butcher (57) ABSTRACT

This invention relates a method of six-dimensional optical multilayer storage using two-photon absorption writing, erasing and optical coherence tomography reading and the apparatus designed based on this method. The invented system stores data in three spatial dimensions plus three physical dimensions of wavelength, intensity and polarization. It has large storage capacity of over 32 Tbytes per DVD sized disk and ultrafast reading speed of over 25 Gbits/s with high signal-to-noise ratio of over 76 dB. The larger capacity of over 1 Pbyte per disk is potential. Furthermore, the invented system has relatively simple optical structure, easy light manipulation for addressing the storage cell and high compatibility with the CDs and DVDs. It is an actually practicable optical large capacity storage technology.

19 Claims, 3 Drawing Sheets

SIX-DIMENSIONAL OPTICAL MULTILAYER STORAGE USING TWO-PHOTON ABSORPTION WRITING, ERASING AND OPTICAL COHERENCE TOMOGRAPHY READING

FIELD OF THE INVENTION

The present invention relates to optical multi-dimensional data storage, and more particularly, to a method of six-dimensional optical multilayer storage using two-photon absorption writing, erasing and optical coherence tomography reading and the apparatus designed based on this method.

BACKGROUND OF THE INVENTION

The traditional way to achieve optical large capacity storage is to store the data in three special dimensions of the medium, namely multilayer storage, or throughout volume of the medium, namely holographic storage. The main problems for the traditional multilayer and holographic storages are interlayer crosstalk noise and disk rotation blurring, which limits the available layer number and degrades the holographic recording quality, respectively.

Another way to achieve optical large capacity storage is the multi-dimensional storage, which adds extra "dimensions", such as the physical dimensions of wavelength, intensity, polarization, phase and even photon angular momentum to three spatial dimensions to increase the storage capacity and improve the system performance. Several four-dimensional and one five-dimensional optical storages have been proposed. Two years ago, Shangqing Liu proposed a six-dimensional storage technology [Shangqing Liu, "Six-dimensional optical storage method and apparatus," U.S. Pat. No. 8,503,279, Issued: Aug. 6, 2013], which adds three physical dimensions of wavelength, intensity and polarization to three spatial dimensions to get large storage capacity and excellent system performance. The theoretical research results show that its storage capacity is over 10 Tbytes per DVD sized disk with ultrafast data transfer speeds.

The extraordinary advantages of that six-dimensional storage are its relatively simple structure and easy light manipulation for addressing the desired storage cell in the fast rotating disk, which make an optical large capacity system of over 10 Tbytes per DVD size disk actually practicable, and a dramatic increase of the data writing, erasing and reading speeds.

In fact, a few proposed optical storage schemes promised larger capacities. An example is the multilayer storage utilizing super resolution writing, which is inspired by a diffraction-unlimited far-field imaging method [S. W. Hell and J. Wichmann, "Breaking the diffraction resolution limit by stimulated emission: stimulated-emission-depletion fluorescence microscopy," Opt. Lett. Vol. 19, pp. 780-782, 1994]. This super resolution writing storage allows the created storage cell size down to nano scale, which is in theory equivalent to Pbytes (petabytes, 1 Pbyte=1024 Tbytes) to Ebytes (exabytes, 1 Ebyte=1024 Pbytes) storage capacity per DVD size disk. However, because the super resolution writing disk is bit-based, that is, each storage cell only holds 1 bit data, its ultrahigh storage capacity depends on its ultra small cell size, which results in serious technical obstacles to the realization of this technology in practice, which include difficult optical readout of nano scale data marks hindered by diffraction limitation, unacceptable low data transfer speeds to ultrahigh capacity as a bit by a bit writing and reading, awesome interlayer crosstalk noise due to $10^3$ to $2\times10^5$ data layers just in a disk of 1 mm thick and too arduous light manipulation for addressing the nano scale cell in three spatial dimensions of the fast rotating disk. Therefore, after ~20 years research and development, the super resolution writing disk is still not available.

The six-dimensional storage technology proposed two years ago, however, has a serious shortage. Its data writing and erasing are based on the direct optical linear absorption, that is, the direct single-photon absorption, and its data reading is only through the confocal microscopy filtering. Thus, the interlayer crosstalk noises are large in the data writing and erasing, and not small enough in the data reading, which degrade the system recording and reading qualities seriously. In addition, it is better if its storage capacity can be increased further.

BRIEF SUMMARY OF THE INVENTION

In order to keep the advantage and improve the shortage of the proposed six-dimensional storage technology, a new type of six-dimensional optical storage technology has been invented, which data writing, erasing and reading are based on the different physical mechanisms. In other words, the data writing and erasing utilize the two-phone absorption, and the data reading utilizes the optical coherence tomography plus confocal microscopy, and so the system structure has a fundamental change. The two-photon absorption is a nonlinear process, which makes laser beam not interact with the medium except at the focal point, and so greatly reduces the interlayer crosstalk noise in data writing and erasing. The three-dimensional two-photon absorption storage has demonstrated a capacity of 1 Tbyte in a 1 mm thick disk with 200 storage layers and a record speed of 25 Mbits/s [E. Walker and P. Rentzepis, "Two photon technology: a new dimension," Nature Photonics Vol. 7, pp. 406-408, 2008]. The three-dimensional optical coherence tomography can selectively receive the light reflected from the desired storage cell by coherent gating [A. F. Fercher, W. Drexler, C. K. Hitzenberger and T. Lasser, "Optical coherence tomography-principles and applications," Rep. Prog. Phys. Vol. 66, pp. 239-303, 2003]. By combining the optical coherence tomography with the confocal microscopy, the interlayer crosstalk noise can be greatly reduced in the data reading.

The feasibility of this invented technology has been demonstrated by theoretical investigations meticulously. The calculation results show that this system has large storage capacity of over 32 Tbytes per DVD sized disk, and ultrafast read and write/erase speeds of over 25 Gbits/s and 10 Gbits/s respectively with high signal-to-noise ratio of over 76 dB. Furthermore, the larger capacity of over 1 Pbyte per DVD size disk is potential. In addition, because this system is not bit-based and its storage cell consists of the plane Bragg reflectors, this system has high tolerances for beam focusing, tracking and disk rotation. These excellent characters will eliminate the main obstacles to the efforts for achieving large capacity optical storage. The structures of this system and its disk are also relatively simple, and its drive is compatible with the CDs and DVDs.

The said method of the invention comprises: using N linearly polarized light beams with different wavelengths, encoded intensities and encoded polarizations to create each group of multiple standing waves overlapped in the medium; and through two-phone absorption to create multiple plane volume gratings in a small volume in the medium as each storage cell; later illuminating the desired storage cell using multiple linearly polarized or unpolarized light beams to produce the group of the reflected beams with matched wavelengths, corresponding intensities and particular polarizations; may utilize optical coherence tomography or confocal microscopy or the both to receive the reflected beams from the desired storage cell; at last by a decoding procedure to decode the received group of the reflected beams from the desired storage cell back to the original data.

The optical storage apparatus designed based on the said method of the invention comprises: one layer or multilayer photorefractive, polarization-sensitive medium which is able to be excited by two-photon absorption with data stored in concentrically circular or spiral tracks in multiple data layers; laser arrays and superluminescent diode arrays generating multiple linearly polarized or linearly polarized and unpolarized beams with different wavelengths, these multiple linearly polarized or linearly polarized and unpolarized beams are arranged to be collinear, concentric and focused with available smallest diameters of the focal depths to write data to, read data from and erase data in the said storage cells; an electronic processor to encode the composite state of wavelengths, intensities and polarization directions of said multiple linearly polarized beams during each short period to correspond to each group of data according to said color shade and polarization direction encoding regulation; photosensor arrays for measuring the intensities and polarization directions of the beams reflected from each desired said storage cell, and an electronic processor for decoding the composite state of the wavelengths, intensities and polarization directions of the beams reflected from each desired said storage cell to reproduce each group of data according to said color shade and polarization direction decoding regulation; an optical means for automatic making the available smallest diameters of said multiple linearly polarized or linearly polarized and unpolarized beams fall in the required data layer in the storage medium; an optical means for automatic tracking to center the multiple linearly polarized or linearly polarized and unpolarized light beam spots on desired said circular or spiral track; an optical means for selectively receive the reflected beams from the desired storage cell in desired data layer; and may have an optical means for making the apparatus to be compatible with the CD and DVD disks.

BRIEF DESCRIPTION OF THE DRAWINGS

The preferred embodiments of the apparatus designed for realizing said method will be described underneath. Obviously, these embodiments are not the all apparatuses which can be designed based on the said method. Basing on the key idea of the invented method and using existing technical knowledge, the said method and the apparatus embodiments may be modified and alternated. Therefore, the applicant of this invention reserves the rights of all modifications, alternatives, and equivalent arrangements of the invented method and the apparatus embodiments described underneath.

The aforementioned aspects and advantages of the invention will be appreciated from the following descriptions of preferred embodiments and accompanying drawings wherein.

DETAILED DESCRIPTION OF THE INVENTION

Figure 1:
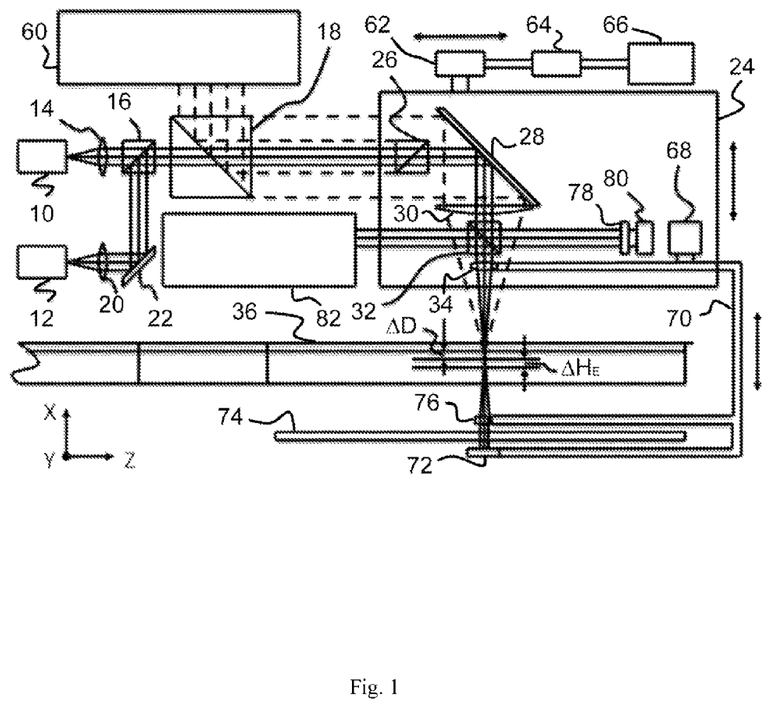
FIG. 1 illustrates schematic optical structure of the six-dimensional multilayer storage system as the preferred embodiment of the invention.

The system is shown in FIG. 1, which can be regarded as a standard disk drive with the addition of a synchronized moving reflective unit under the disk, and using laser and superluminescent diode arrays as write/erase and read light sources and photosensor arrays as signal detector.

The write/erase light source 10 contains M fixed frequency distributed-feedback (FF-DFB) semiconductor laser arrays, and so forms a wavelength-selectable light source. The structures of M laser arrays are same. In each laser array, there are N FF-DFB lasers. The number N is normally from 30 to 70. Each of these FF-DFB lasers is manufactured with a slight wavelength shift $\delta\lambda_W$ of 4 nm to 13 nm. Thus, each laser array has a wavelength distribution of $\lambda_{W1}, \lambda_{W2}, \lambda_{W3}, \ldots,$ and $\lambda_{WN}$ within the range $\Delta\lambda_W$, and the wavelength distributions of M laser arrays are same. Normally, $\Delta\lambda_W$ is in visible and near infrared ranges, and may extend to the ultraviolet range. In each laser array, the laser beams enter a multi-mode interference optical coupler through N S-bent waveguides, and then go out of the array through a broadband waveguide.

M sheet polarizers are used to offset beam polarization directions of M laser arrays by angle change $\delta\alpha$. Thus, the polarization angles of the beams from M laser arrays are $\alpha_1$, $\alpha_2=\alpha_1+\delta\alpha$, $\alpha_3=\alpha_2+\delta\alpha, \ldots, \alpha_M=\alpha_{M-1}+\delta\alpha$, respectively, and $\alpha_M=\alpha 1+90°$. Then, these polarized beams enter a broadband and polarization preserving optical coupler through M waveguides, and finally go out of the coupler through a broadband waveguide. The number M of the laser arrays is usually from 3 to 16. All FF-DFB laser beams are Gaussian beams.

Such kind of wavelength-selectable light source has been made by several manufacturers including NEC (without inserted sheet polarizers). The NEC device [N. Natakeyama, K. Naniwae, K. Kudo, N. Suzuki, S. Sudo, S. Ae, Y. Muroya, K. Yashiki, S. Satoh, T. Morimoto, K. Mori and T. Sasaki, "Wavelength-selectable microarray light sources for S-, C-, and L-band WDM systems," IEEE Photon. Technol. Lett. Vol. 15, pp. 903-905, 2003] contains 6 laser arrays, and each array consists of 8 FF-DFB lasers. 6 laser arrays provide 135 frequency selectable channels (also tuned by varying the temperature) with a total selectable wavelength range of ~120 nm. The chip size of each laser array is 0.4×2.15 mm². The channel switching time of 1.5 ns for wavelength-selectable light source has been demonstrated [R. Phelan, W. H. Guo, Q. Lu, D. Byrne, B. Roycroft, P. Lambkin, B. Corbett, F. Smyth, L. P. Barry, B. Kelly, J. O'Gorman and J. F. Donegan, "A novel two-section tunable discrete mode Fabry-PÉrot laser exhibiting nanosecond wavelength switching," IEEE J. Quantum Electron. Vol. 44, pp. 331-337, 2008]. The semiconductor lasers are manufactured by photolithography and electron beam lithography, and can be integrated with a large number, so the laser array containing several dozen lasers may have acceptable size.

The read light source 12 contains two superluminescent diode arrays with N diodes in each array. The beams in each diode array have a (central) wavelength distribution of $\lambda_{R1}$, $\lambda_{R2}, \lambda_{R3}, \ldots,$ and $\lambda_{RN}$ within the range $\Delta\lambda_R$. The structures and wavelength distributions of two diode arrays are same. At present, the superluminescent diode wavelengths are not in blue and near ultraviolet ranges, so N miniature frequency doublers are inserted in the N diode beams to shorten their wavelengths to $\lambda'_{R1}, \lambda'_{R2}\lambda'_{R3}, \ldots,$ and $\lambda'_{RN}$ in the range $\Delta\lambda'_R$. Afterwards, the beams pass through the waveguides and multi-mode interference optical couplers, and finally go out of two diode arrays. The organic polymeric frequency doublers may be used to reduce doubler size, or only using two broadband doublers, each of them for each of two diode arrays.

Also using two sheet polarizers to make the output beams of two diode arrays become linearly polarized light with orthogonal polarization directions, and make their polarization angles be $\alpha_1$ and $\alpha_M$, respectively. The beams from two diode arrays enter a broadband and polarization preserving optical coupler through 2 waveguides, and finally go out of the coupler through a waveguide. The superluminescent diodes are semiconductor elements too, so the diode array containing several dozen superluminescent ones may still have acceptable size. All superluminescent diode beams are Gaussian beams too.

By turning on the drive currents on the selected FF-DFB lasers in the selected laser arrays, the beams with desired wavelengths and polarizations are generated. By adjusting the injection currents simultaneously, the desired output powers of the selected FF-DFB lasers are obtained too. All of these controls are on the FF-DFB lasers directly, and so the wavelength, polarization and intensity switching speeds can go up to a nanosecond.

During each short period, the values of the wavelengths, polarizations and intensities of the write/erase beams, which are from the write/erase light source, correspond with a certain data group according to a color-brightness and polarization encoding regulation. This regulation is predetermined in such a way: every possible composite state of the wavelengths, polarization directions and intensities of the write/erase beams is defined to correspond with a basic symbol of a suitable digital encoding scheme. Thus, any data group with limited amount may be represented by a group of the composite states of the wavelengths, polarization directions and intensities of the write/erase beams.

The write/erase beams are converged by a lens 14. Then they enter a non-polarizing and lowpass beam splitter 16. The wavelengths of the write/erase beams are in the transmission range of this splitter, thus these beams enter a non-polarizing and narrowband reflective beam splitter 18. The read beams from the read light source 12 are converged by a lens 20. Then they are reflected by a mirror 22 and enter the splitter 16. The wavelengths of the read beams after frequency doubling are not in the transmission range of this splitter, so these beams are reflected and then become parallel, collinear and concentric with the write/erase beams, and enter the splitter 18 too. The wavelengths of the write/erase and read beams are not in the reflective wavelength range of the splitter 18, so these beams pass this splitter and enter an actuator 24.

In the actuator, 26 is a beam splitter with a same reflective wavelength range as that of the splitter 18. Thus, the write/erase and read beams can pass this splitter, and then are reflected by a mirror 28. After going through the central round hole of the convergent lens 30 (the hole size is just let the write/erase and read beams pass), these beams enter a non-polarizing and lowpass beam splitter 32. The wavelengths of the write/erase beams are not in the reflective wavelength range of this splitter. The wavelengths of the read beams are in the reflective wavelength range of this splitter. The splitter 32 reflectivities for all read beam are 50%. Thus, all light energy of the write/erase beams and half light energy of the read beams enter convergent lens 34 and become collinear, concentric and focused beams. The numerical aperture of the lens 34 is less than 0.3, which is much lower than those required by most large capacity storage systems (from 0.6 to over 0.85). The high numerical aperture of the focusing lens causes finer beam focusing and tracking, and so bringing extra complexity to the system.

The low numerical aperture being allowed is because of long beam focus depth. The lens 34 is an achromatic lens, and its optical axes and that of the lens 30 are collinear and concentric. Using achromatic lens is for making the focus depths of all write/erase beams or all read beams locate in an available thinnest volumetric layer. $\Delta H_E$ is thickness of such a volumetric layer in the disk. Since each volume occupied by "all focus depths" of the write beams stores a data group, $\Delta H_E$ is also the length of storage cell.

Figure 2:
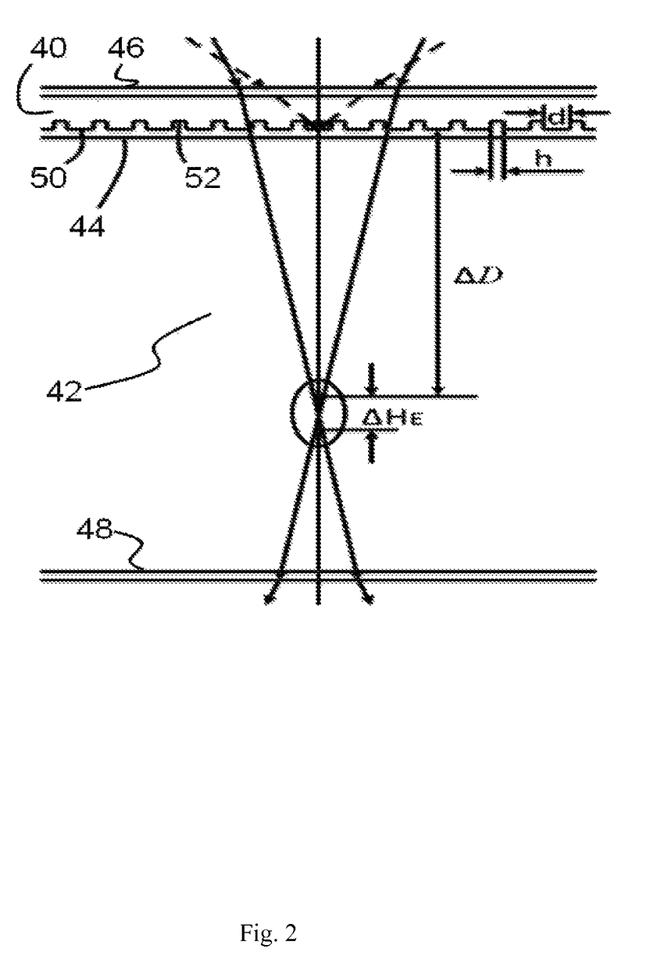
FIG. 2 illustrates schematic optical structure of the part of the disk 36 in FIG. 1, which is mounted on a rotation spindle.

The optical structure of the system disk 36 is shown in FIG. 2, which comprises a substrate layer 40, an optical storage medium layer 42, a narrowband reflective filter layer 44 and two cover layers 46, 48. The grooves 50 on the substrate layer form concentrically circular or spiral tracks separated by lands 52. The widths of groove and land are d and h, respectively. The substrate, the narrowband reflective filter and two cover layers are transparent to the write/erase and read beams. The cover layers protect the substrate and storage medium from scratch, stain and so on, and to reduce unwanted reflections. The structure of this disk is fairly simple comparing with many newly proposed ones. When the storage medium is made of cheap material, such as the photopolymer films, the disk cost is low.

At any working time, the actuator must keep a fixed distance from the disk, which is realized by automatic focusing. A linearly polarized beam comes from an automatic focusing and tracking controller 60 (see FIG. 1) and is used as the adjustment beam for the actuator. In FIGS. 1 and 2, dashed lines represent light rays of the adjustment beam and solid lines represent those of the write/erase and read beams. The adjustment beam wavelength is so selected that it is reflected by the splitters 18 and 26. The cross-section of the splitter 26 facing the adjustment beam is round and not large. Thus, the most light of the adjustment beam can reach the mirror 28 except its central part, and then, after converged by the lens 30, falls on the disk 36.

Because the narrowband reflective filter layer 44, which has a same reflective wavelength range as the splitters 18, is under the grooves, the adjustment beam is reflected back and returns to the automatic focusing and tracking controller 60. The controller has an optical signal analyzer for the returned adjustment beam, which works in the same way as that adopted by CD drive [M. Bass, E. W. V. Stryland, D. R. Williams and W. L. Wolfe, eds., Handbook of Optics, Vol. I, pp. 31.13-31.18, McGraw-Hill, New York, 1995]. Therefore, the controller may send signals to voice coil motor 62 to push or pull the actuator toward or away the disk, and make the adjustment beam focus kept on the groove surface with a variation of less than 0.1 µm during disk rotation. Meanwhile, the controller also sends signals to another voice coil motor 64 to move the actuator along the disk radial direction back and forth. Every time, a step motor 66 moves the actuator to the desired track depending on the track indication marks pre-written in the track first. Then, via automatic tracking by voice coil motor 64, the adjustment beam focus is centered at the desired groove, and so is kept to the desired track during disk rotation. The adjustment beam and the write/erase and read beams are arranged to be collinear and concentric, and they are also arranged with an adjustable distance $\Delta D$ between the adjustment beam focus depth centre and the top edge of the "all focus depths" of the write/erase or read beams. The adjustment of $\Delta D$ is by the third voice coil motor 68, which is mounted in the actuator and moves the lens 34 along X axis through a rigid connection rod 70. Thus, when the adjustment beam is focused and centered on a given groove, the write/erase or read beams are centered on a same track, and all focus depths of the write/erase or read beams are in a certain volumetric layer.

A small mirror 72 is placed under the disk and always moves synchronously with the lens 34 by rigid rod connection to avoid frequent alignment. An optical shutter 74 is placed between this mirror and the disk. When writing or erasing the data, the shutter is moved out of the beam paths, thus the beams are reflected back into the disk. When reading the data, this shutter is moved in the beam paths to block the beams.

This system is compatible with CD and DVD. By turning on only one FF-DFB laser or one of two additionally added semiconductor lasers in the write/erase light source 14 (whose wavelength is close to or same as that used in the CD or DVD drive), a CD or DVD may be played and edited in this system. Because the CD and DVD have similar data tracks which form a data layer, the actuator 24 can focus the adjustment beam on the data layer of the CD or DVD, and to center the adjustment beam spot at the desired data track. Then, the lens 34 may focus the laser beam from the write/erase light source on the same data track to read the data. The data write and erase are implemented by increasing the intensity of the read laser beam.

When the write/erase beams pass through the disk, they are converged by another achromatic lens 76 which focus length matches the lens 34. Then, these beams are reflected back perpendicularly by the mirror 72. After backed into the storage medium, these returned beams interfere with the subsequently incident beams. In the interference area, each of the returned beams only interferes with the matched incident beam which has same wavelength and polarization. Therefore, the standing wave is formed for every write/erase beam in the storage medium. The distance between lenses 34 and 76 are kept un-changed at any time by the connection rod, which is made thin and light so not to affect the actuator response speed.

The storage medium 42 is made of photorefractive and polarization-sensitive material which is able to be excited by two-photon absorption. Many researchers have reported two-photon absorption induced refractive index change [H. Guo, H. Jiang, L. Luo, C. Wu, H. Guo, X. Wang, H. Yang, Q. Gong, F. Wu, T. Wang and M. Shi, "Two-photon polymerization of gratings by interference of a femtosecond laser pulse," Chem. Phys. Lett. Vol. 374, pp. 381-384, 2003; J-A. Reyes-Esqueda, L. Vabre, R. Lecaque, F. Ramaz, B. C. Forget, A. Dubois, B. Briat, C. Boccara, G. Roger, M. Canva, Y. Levy, F. Chaput and J-P. Boilot, "Optical 3D-storage in sol-gel materials with a reading by Optical Coherence Tomography-technique," Opt. Commun. Vol. 220, pp. 59-66, 2003] and polarization characteristics change [A. Kozanecka-Szmigiel, K. Switkowski, E. Schab-Balcerzak and E. Grabiec, "Two-photon-induced birefringence in azo-dye bearing polyimide; the birefringence changes versus the writing power," Appl. Phys. B: Laser Opt. Vol. 105, pp. 851-855, 2011; Y. Hu, Z. Zhang, Y. Chen, Q. Zhang and W. Huang, "Two-photon-induced polarization-multiplexed and multilevel storage in photoisomeric copolymer film," Opt. Lett. Vol. 35, pp. 46-48, 2010] in certain materials, and especially in photopolymers. The optical periodic structures including holographic fringes and diffractive gratings created by two laser beam interference under two-photon absorption have also been observed [H. Guo, H. Jiang, L. Luo, C. Wu, H. Guo, X. Wang, H. Yang, Q. Gong, F. Wu, T. Wang and M. Shi, "Two-photon polymerization of gratings by interference of a femtosecond laser pulse," Chem. Phys. Lett. Vol. 374, pp. 381-384, 2003; A. Rebane, M. Drobizhevl and A. Karotki, "Frequency-domain gratings by simultaneous absorption of two photons," J. Lumin. Vol. 98, pp. 341-353, 2002]. The induced refractive index change is at least up to 0.005, and the created grating diffraction efficiency is not less than 57%.

Here, the photopolymer is chosen as the storage medium, and using azo-dye bearing polyimide film to initially demonstrate the invention. This type of polymer shows that two orthogonal axes of polyimide molecule can be reoriented by linearly polarized light with high intensity, resulting in two-photo induced and writing power dependent birefringence change of bulk medium [A. Kozanecka-Szmigiel, K. Switkowski, E. Schab-Balcerzak and E. Grabiec, "Two-photon-induced birefringence in azo-dye bearing polyimide; the birefringence changes versus the writing power," Appl. Phys. B: Laser Opt. Vol. 105, pp. 851-855, 2011]. That is, through polarized light illumination, if the refractive index in the polarization direction (named $n_\parallel$) decrease, the in-plane index perpendicular to this direction ($n_T$) will accordingly increase. The induced birefringence value $\Delta n = n_\parallel - n_T$ depends on writing light intensity and exposure time, and can be erased to zero by circular polarized light when the writing light intensity is below a destructive threshold value (over which the remained birefringence can't be removed). The required average writing power and exposure time are 50 mW and 425 s for inducing two-photon birefringence change, which corresponds to the peak writing intensity of 7.1 GW/cm$^2$ and effective illumination period of 42.5 ns since using 100 fs pulses at 1 kHz repetition rate, and when the average writing power and exposure time are 400 mW and 425 s, the induced erasable birefringence change is 0.005 [A. Kozanecka-Szmigiel, K. Switkowski, E. Schab-Balcerzak and E. Grabiec, "Two-photon-induced birefringence in azo-dye bearing polyimide; the birefringence changes versus the writing power," Appl. Phys. B: Laser Opt. Vol. 105, pp. 851-855, 2011]. The destructive average writing power is 700 mW. Requiring high peak writing intensity is due to low two-photon absorption cross-section of this film. Thus, if the diameters of the write beam focus depths are around 1 μm, since 7.1 GW/cm$^2$ equals 71 W/μm$^2$, the lasers with peak powers of over 71 W are needed. At present, although the semiconductor lasers can produce such high peak powers, such as up to 250 W quasi-continuous wave [http://www.coherent.com/products/?1534/Diode-Lasers], their sizes will make the whole system bulky. However, the system size will not be a problem in the future and not far away, because the progress in developing new compounds with larger two-photon cross-sections is very fast. For example, the two-photon cross-sections of normal laser dyes are in order of 0.1–10 GM (1 GM=10$^{-50}$ cm$^4$ s photon$^{-1}$) [A. Rebane, M. Drobizhevl and A. Karotki, "Frequency-domain gratings by simultaneous absorption of two photons," J. Lumin. Vol. 98, pp. 341-353, 2002]. However, the newly reported two-photon cross-section is up to 25,000 GM in pyrene core dendrimers [Y. Wang, L. Yan, Z. Zhao, X. Ma, Q. Guo, M. Jia, P. Lu, G. Ramos-Ortiz, J L. Maldonado, M. Rodriguez and A. Xia, "Gigantic two-photon absorption cross sections and strong two-photon excited fluorescence in pyrene core dendrimers with fluorene/carbazole as dendrons and acetylene as linkages," J. Phys. Chem. B Vol. 114, pp. 11737-11745, 2010]. In addition, the compactness of the semiconductor lasers is also improved constantly. The investigated system will have a reasonable size without doubt.

In the data write status, during every short period, the write beams (that is, the write/erase beams) create multiple standing waves overlapped in the medium. In the focus depth of each beam, both of the light intensity and intensity gradient (from a node to an anti-node of the standing wave) are very large. The light intensity, which is inversely proportional to the square of the distance to the focus depth center, drops rapidly outside the focus depth. As two-photon absorption is a nonlinear process which depends on the square of the light intensity, the two-photon absorption almost only occurs in the beam focus depth. The induced molecular axis orientations and refractive index perturbations are periodically modulated because of periodically spatial variation of the light intensity in the interference area. As a result, according to theoretical derivation [A. Rebane, M. Drobizhevl and A. Karotki, "Frequency-domain gratings by simultaneous absorption of two photons," J. Lumin. Vol. 98, pp. 341-353, 2002], and experimental observations [H. Guo, H. Jiang, L. Luo, C. Wu, H. Guo, X. Wang, H. Yang, Q. Gong, F. Wu, T. Wang and M. Shi, "Two-photon polymerization of gratings by interference of a femtosecond laser pulse," Chem. Phys. Lett. Vol. 374, pp. 381-384, 2003; A. Rebane, M. Drobizhevl and A. Karotki, "Frequency-domain gratings by simultaneous absorption of two photons," J. Lumin. Vol. 98, pp. 341-353, 2002], a resonant grating is created in the beam focus depth at an optical frequency, which is double the initial frequency of the writing light. Since each beam interferes with its perpendicularly reflected beam, the created grating is plane volume grating. Also since the index perturbation layers of the grating are parallel with the disk radial direction, the disk rotation will not affect grating creation, and so not reduce grating quality. These gratings will remain after beam illuminations.

In the data erase status, during required periods, the intensities of erase beams (that is, the write/erase beams) with required wavelengths are adjusted to have a same specified value. Their polarizations are switched to a same specified direction. Thus, all of the desired gratings are re-written into a same special state. In the said color-brightness and polarization encoding and decoding regulations, all of the composite states consist of this specified intensity, this specified polarization direction and any wavelengths are predetermined to represent "no data". Therefore, by choosing erase beam wavelengths and illumination periods, the desired gratings are wiped to the "no data" states, and so to erase the partial or total stored data. The data erasing may also use the way of rewriting the whole storage cell containing the desired gratings, that is, to rewrite ones needing retained and to erase ones needing wiped, which avoids aiming the desired gratings.

In the data read status, all superluminescent diodes in the read light source 12 are turned on simultaneously. Thus the read beams have all (central) wavelengths of $\lambda'_{R1}$, $\lambda'_{R2}$, $\lambda'_{R3}$, ..., and $\lambda'_{RN}$ within the range $\Delta'_R$, and there are always two beams having orthogonal polarizations for every (central) wavelength. The intensities of these beams are adjusted to be same and below the threshold value of changing storage medium birefringence. When these read beams enter the splitter 32, since the splitter reflectivities for all read beams are 50%, every read beam is divided into two components, one passes the splitter and becomes "detection" beam, and another goes to a mirror 78 and becomes "reference" beam. When the detection beams illuminate the disk, via actuator automatic focusing and tracking all focus depths of the detection beams fall in a desired volumetric layer and in a desired track.

As the created gratings are volume diffractive gratings consisting of the molecules with polarized orientations, they are sensitive to light wavelength and polarization. When such a grating is illuminated by read beams, it will selectively reflect (by diffraction) the beam with matched wavelength and polarization. As a two-photon grating, its matched wavelength is half the initial of its write beam and its polarized direction is parallel with the polarization direction of its write beam. Furthermore, its reflectivity depends on the write beam intensity because the grating diffraction efficiency depends on the index modulation amplitude, that is, the amplitude of the spatial modulation of the refractive index, which is determined by the write beam intensity. The wavelength sensitivity and writing beam intensity dependent diffractive efficiency of two-photon gratings have been observed [H. Guo, H. Jiang, L. Luo, C. Wu, H. Guo, X. Wang, H. Yang, Q. Gong, F. Wu, T. Wang and M. Shi, "Two-photon polymerization of gratings by interference of a femtosecond laser pulse," Chem. Phys. Lett. Vol. 374, pp. 381-384, 2003; A. Rebane, M. Drobizhevl and A. Karotki, "Frequency-domain gratings by simultaneous absorption of two photons," J. Lumin. Vol. 98, pp. 341-353, 2002; T. Katchalskia, S. Soriab, E. Teitelbauma, A. A. Friesema and G. Marowskyc, "Two photon fluorescence sensors based on resonant grating waveguide structures," Sensor. Actuat. B Vol. 107, pp. 121-125, 2005]. The polarization sensitivity of the medium with two-photon induced polarization anisotropy has also been observed [Y. Hu, Z. Zhang, Y. Chen, Q. Zhang and W. Huang, "Two-photon-induced polarization-multiplexed and multilevel storage in photoisomeric copolymer film," Opt. Lett. Vol. 35, pp. 46-48, 2010].

For a uniform phase grating, H. Kogelnik has calculated its diffraction properties by using coupled wave theory [H. Kogelnik, "Coupled wave theory for thick hologram gratings," The Bell System Tech. J. Vol. 48, pp. 2909-2947, 1969]. In a non-slanted reflection grating the recorded fringe-planes are of an orientation which is more or less parallel to the surface of the recoding medium, and the signal appears as a "reflection" of the reference wave. Most volume Bragg gratings are phase gratings with low absorption. Consider a non-slanted reflective grating with thickness D and index modulation amplitude $n_f$. The diffraction efficiency $\eta$ is defined as the ratio between the diffracted intensity and the incident intensity, without considering absorption and Fresnel reflections at the interfaces, and supposing the average refractive index n of the medium is much larger than $n_f$. The diffraction efficiency is $$\eta = \frac{1}{\left[1 + \frac{\left(1 - \frac{\xi^2}{v^2}\right)}{sh^2(v^2 - \xi^2)^{\frac{1}{2}}}\right]}, \text{ where} \quad (1)$$

$$\xi = \frac{\delta\theta \cdot KD \cdot \sin(\theta_0 - \phi)}{2C_S} = \frac{\delta\lambda \cdot K^2 D}{8\pi n C_S}, \quad (2)$$

$$v = \frac{j\pi n_f D}{\lambda(C_R C_S)^{\frac{1}{2}}}. \quad (3)$$

$\delta\theta$ and $\delta\lambda$ are the angular and wavelength deviations, K is grating vector, $C_R$ and $C_S$ are obliquity factors for reference wave and signal wave propagation vectors, respectively. For a non-slant reflection grating, $\phi=0$, for Bragg incidence, $C_R=-C_S=\cos\theta_0$, where $\theta_0$ is the incident angle inside the medium of index n, and $\lambda$ is the wavelength of the reference wave in free space.

By choosing $2\lambda'_{Ri}=\lambda_{Wi}$ (i=1, 2, 3, ... N), any created grating will match and so reflect one of the detection beams. In the detection beams, since there are always two orthogonal polarized ones having same wavelength, no matter what the dominant molecular orientation of a grating is, the light of the beams whose wavelengths match that grating will be reflected partially. The detection beams not meeting the matched gratings will go out of the disk and are blocked by the shutter.

When a detection beam is reflected back from its matched grating, it will be recombined with a reference beam having same wavelength and polarization returned from the mirror 78, resulting in forming interference fringes on exit of the splitter 32. One can see that a Michelson interferometer consisting of the detected grating (sample arm), the mirror 78 (reference arm) and the splitter 32 is built. Because the superluminescent diode beams have short coherence lengths due to their broad bandwidths, only if light from both arms have traveled almost the "equal" optical distances, that is, when the difference between two optical distances on two arms is less than the coherence length, the interference fringes may appear. Any light that is not within the short coherence length will not interfere, and areas that reflect back more light will produce greater interference than areas that don't. Therefore, when the detection beams are focused by the lens 34 on a certain storage cell containing multiple gratings, by moving the mirror 78 along Z axis to a corresponding position by a voice coil motor 80 and making the coherence length of each read beam equal to the length of its matched grating (or the storage cell), the light reflected from that storage cell may be selectively received by coherent gating. Thus, optical coherence tomography [A. F. Fercher, W. Drexler, C. K. Hitzenberger and T. Lasser, "Optical coherence tomography—principles and applications," Rep. Prog. Phys. Vol. 66, pp. 239-303, 2003; Z. Yaqoob, J. Wu and C. Yang, "Spectral domain optical coherence tomography: a better OCT imaging strategy," Bio. Techniques Vol. 39, pp. S6-S13, 2005] is adopted here for reading. In addition, each detected grating and its corresponding photosensors, which detect the intensity and polarization direction of the beam reflected from that grating, are located at the confocal positions, and since the sizes of each detected grating and its corresponding photosensors are very small, the confocal microscopic detections are also formed for reading simultaneously.

Figure 3:
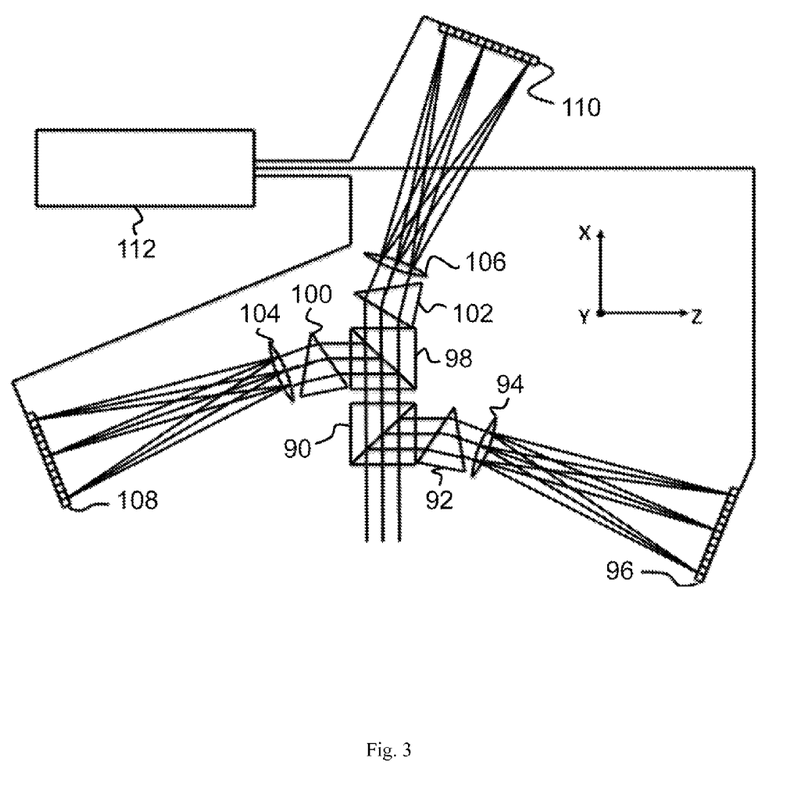
FIG. 3 illustrates the schematic optical structure of intensity, polarization and wavelength detection system 82 in FIG. 1.

Half light of recombined detection and reference beams enter a signal detection system 82, which detailed optical structure is illustrated in FIG. 3. 90 is a non-polarizing and non-color-selective beam splitter with a fixed reflectivity of 30%. Thus, the 30% of the entering beams go to dispersion prism 92. After converged by lens 94, 30% of each pair of the entering beams having same wavelength and orthogonal polarizations is received by an intensity detector in photosensor array 96 through a confocal pinhole array placed at the confocal plane of the lens 94 (the pinhole array is not drawn in the FIG. 3 as it is very thin) for intensity detection. Adding the spatial pinhole array is to eliminate out-of-focus light. Thus, the confocal microscopy is utilized for detection too. The photosensor number of the array 96 is N, which is same as the diode number in each diode array. These photosensors lie in a line and so locate at different positions. Thus, the wavelength of the detected beams can be determined by related intensity detector position. In order to show beam paths clearly, only three beam pairs are drawn.

The 70% of the entering beams are further divided into two beam groups with two orthogonal polarizations by a polarizing beam splitter 98. After dispersed by two dispersion prisms 100 and 102, and converged by two lenses 104 and 106, 70% of each pair of the entering beams having same wavelength and orthogonal polarizations are received by two intensity detectors in two photosensor arrays 108 and 110, respectively. Two spatial confocal pinhole arrays are also placed at the confocal planes of the lens 104 and 106 and before the photosensor arrays 108 and 110, respectively. Each pair of the detectors receiving the beams having same wavelength forms a differential detection element. Since the polarization direction of every beam detected by the photosensor array 108 is parallel with the Y axis, and so its intensity is named as $I_\parallel$. As the same reason, the intensity of every beam detected by the photosensor array 110 is named as $I_T$. The values $I_\parallel$ and $I_T$ are sent to a signal analyzer 112 (112 also includes an electronic process) to produce a differential signal value $\Delta I = I_\parallel - I_T$. Thus, a particular direction, which depends on the dominant molecular orientation of each grating and is named as the "synthetic polarization direction" (SPD) of each pair of the entering beams can be calculated. For example, if $I_\parallel = 0$ or $I_T = 0$, the SPD will be perpendicular to or parallel with the Y axis. If $I_\parallel = I_T$, the SPD will be oriented at 45° relative to the Y axis. If $I_\parallel > I_T \neq 0$ or $I_T > I_\parallel \neq 0$, the SPD will be close to the Y or Z axis more, and the orientation angle may be calculated from the value $\Delta I = I_\parallel - I_T$. The wavelength corresponding to each SPD is also determined by the position of each differential detection element. At last, the detected intensities, wavelengths and SPDs are decoded back to the original data through a decoding procedure, which is a reverse procedure of the said color-brightness and polarization encoding, by an electronic processor in 112.

Although dispersive prisms and linear detector arrays are used, the adopted signal acquisition mechanism is still the time domain optical coherence tomography (TDOCT) which is different from the frequency domain optical coherence tomography (FDOCT) [A. F. Fercher, W. Drexler, C. K. Hitzenberger and T. Lasser, "Optical coherence tomography—principles and applications," Rep. Prog. Phys. Vol. 66, pp. 239-303, 2003; Z. Yaqoob, J. Wu and C. Yang, "Spectral domain optical coherence tomography: a better OCT imaging strategy," Bio. Techniques Vol. 39, pp. S6-S13, 2005]. In the FDOCT, the longitudinal scan along X axis is completed by calculating acquired spectra via a Fourier-transform and without movement of the reference arm. However, here, all focus depths of the detection beams locate overlapped in an available shortest storage cell, and the mirror 78 must move to make this storage cell selected. If each read beam is detected by several photosensors lying in a line, N separate measuring systems adopting FDOCT are set up, which have some advantages. However, it will bring complexity to the systems due to spectra calculations.

Most digital data are stored in binary numeral form. In the binary numeral system, the data unit is bit, which is the amount of the data stored in one of two possible states. So one bit can hold two values at its maximum. The maximum number of the values which can be contained in a data group with m-bit size is $2^m$. For the storage system based on the color-brightness and polarization encoding, the maximum number of the values stored in one storage cell depends on how many wavelengths, polarizations and intensities are utilized, that is, depends on how many composite states of the write beam wavelengths, polarizations and intensities are available. The available composite states of two beams with different wavelengths, and each of them has 2 possible polarizations and 2 possible intensities are shown in the Table A. In the Table A, every composite state is symbolized by WPI, where W is 1 or 2, which represents 2 wavelengths, P is A or B, which represents 2 polarizations, and I is a or b. which represents 2 intensities.

TABLE A

Available Composite States of 2 Wavelengths, 2 Polarizations & 2 Intensities

| | |
|---|---|
| 01 | 1Aa2Aa |
| 02 | 1Aa2Ab |
| 03 | 1Aa2Ba |
| 04 | 1Aa2Bb |
| 05 | 1Ab2Aa |
| 06 | 1Ab2Ab |
| 07 | 1Ab2Ba |
| 08 | 1Ab2Bb |
| 09 | 1Ba2Aa |
| 10 | 1Ba2Ab |
| 11 | 1Ba2Ba |
| 12 | 1Ba2Bb |

TABLE A-continued

Available Composite States of 2 Wavelengths,
2 Polarizations & 2 Intensities

| | |
|---|---|
| 13 | 1Bb2Aa |
| 14 | 1Bb2Ab |
| 15 | 1Bb2Ba |
| 16 | 1Bb2Bb |

One can see that the available composite state number of the beam group of W=2, P=2 and I=2 is $(2\times2)^2=16$. In the same way, it is easy to demonstrate that the state number of the beam group of W=3, P=2 and I=2 is $(2\times2)^3=64$, and that of the beam group of W=3, P=2 and I=3 is $(2\times3)^3=216$, and so on. Therefore, if a beam group has $N_W$ beams with different wavelengths, and each beam has $N_P$ possible polarizations and $N_I$ possible intensities, its state number, which determines the maximum value number storable in the storage cell written by this beam group, is $(N_P \times N_I)^{N_W}$. One can see that the data storage capacity of such a storage cell is very large even the values of $N_W$, $N_P$ and $N_I$ are moderate.

In order to increase storage density, the diameters of the created gratings must be small. The grating diameter is limited by grating length due to light diffraction. Since there are multiple gratings overlapped in every storage cell, these gratings may be identified only when every grating reflection bandwidth is enough narrow, which depends on the grating length.

The available smallest diameter of the volume Bragg grating for a given grating length is calculated below. As the write/erase and read beams are Gaussian beams, the axial variation of the radius of these beams is described by [M. Bass, E. W. V. Stryland, D. R. Williams and W. L. Wolfe, eds., Handbook of Optics, Vol. I, pp. 11.23-11.24, McGraw-Hill, New York, 1995].

$$\omega(x) = \omega_0 \left[1 + \left(\frac{\lambda x}{n\pi\omega_0^2}\right)^2\right]^{\frac{1}{2}} = \omega_0 \left[1 + \left(\frac{x}{x_0}\right)^2\right]^{\frac{1}{2}}, \quad (4)$$

where $\omega(x)$ is the beam cross section radius at any location x measured from beam smallest waist $\omega_0$, n is the medium refractive index, $\lambda$ is the beam free-space wavelength, and $$x_0 = \frac{n\pi\omega_0^2}{\lambda} \quad (5)$$

is the distance over which the beam cross section radius expands to a value of $\sqrt{2}\omega_0$. $x_0$ is called the Rayleigh range. Because the light intensity drops rapidly outside the Rayleigh range, the distance between two points, at which the beam cross section radius is $\sqrt{2}\omega_0$, is called the beam focus depth, that is, the focus depth D of the Gaussian beam is $$D = 2x_0. \quad (6)$$

The refractive indexes of the photopolymer films can be found in many publications, which is from 1.4 to 1.99, and is at least up to 1.7 for two-photon absorption ones [T. Katchalskia, S. Soriab, E. Teitelbauma, A. A. Friesema and G. Marowskyc, "Two photon fluorescence sensors based on resonant grating waveguide structures," Sensor. Actuat. B Vol. 107, pp. 121-125, 2005]. From the equations (5) and (6), when the focus depth length is D and the medium refractive index is n, the diameter d of the Gaussian beam, which wavelength is $\lambda$, is $$d = \sqrt{\frac{2D\lambda}{n\pi}}. \quad (7)$$

Because two-photon absorption wavelength range, such as in the azo-dye bearing polyimide film, is from 550 nm to beyond 240 nm (the corresponding single-photon absorption wavelength range is from 1100 nm to 480 nm), the wavelength $\lambda$, may be taken as 250 nm to 460 nm at intervals of 10 nm, then when taking D=8 μm, n=1.7 or 1.9, the available smallest beam diameters d may be calculated, which are shown in Table B.

TABLE B

Diameters, Reflectivities and Reflection Bandwidths of the Volume Bragg Gratings

| | $\eta_I$ | 0.0048 | 0.0050 | 0.0052 | 0.0054 | 0.0056 | 0.0058 | 0.0060 | 0.0062 | 0.0064 | 0.0066 | 0.0068 |
|---|---|---|---|---|---|---|---|---|---|---|---|---|
| | D | 8 | 8 | 8 | 8 | 8 | 8 | 8 | 8 | 8 | 8 | 8 |
| n | $\lambda$ | 250 | 260 | 270 | 280 | 290 | 300 | 310 | 320 | 330 | 340 | 350 |
| 1.7 | d | 0.865 | 0.883 | 0.899 | 0.916 | 0.932 | 0.948 | 0.964 | 0.979 | 0.994 | 1.009 | 1.024 |
| 1.7 | R | 0.2010 | 0.2015 | 0.2020 | 0.2025 | 0.2029 | 0.2034 | 0.2038 | 0.2041 | 0.2045 | 0.2048 | 0.2051 |
| 1.7 | $\delta\lambda$ | 3.84 | 4.16 | 4.48 | 4.82 | 5.18 | 5.54 | 5.92 | 6.30 | 6.70 | 7.12 | 7.54 |
| 1.7 | $d\lambda$ | 2.02 | 2.19 | 2.36 | 2.54 | 2.72 | 2.91 | 3.11 | 3.31 | 3.52 | 3.74 | 3.96 |
| 1.9 | d | 0.819 | 0.835 | 0.851 | 0.866 | 0.882 | 0.897 | 0.912 | 0.926 | 0.941 | 0.955 | 0.969 |
| 1.9 | R | 0.2010 | 0.2015 | 0.2020 | 0.2025 | 0.2029 | 0.2034 | 0.2038 | 0.2041 | 0.2045 | 0.2048 | 0.2051 |
| 1.9 | $\delta\lambda$ | 3.44 | 3.72 | 4.02 | 4.32 | 4.64 | 4.96 | 5.30 | 5.64 | 6.00 | 6.36 | 6.74 |
| 1.9 | $d\lambda$ | 1.81 | 1.96 | 2.11 | 2.27 | 2.43 | 2.61 | 2.78 | 2.96 | 3.15 | 3.35 | 3.55 |
| | $\eta_I$ | 0.0070 | 0.0072 | 0.0074 | 0.0075 | 0.0077 | 0.0079 | 0.0081 | 0.0083 | 0.0085 | 0.0087 | 0.0089 |
| | D | 8 | 8 | 8 | 8 | 8 | 8 | 8 | 8 | 8 | 8 | 8 |
| n | $\lambda$ | 360 | 370 | 380 | 390 | 400 | 410 | 420 | 430 | 440 | 450 | 460 |
| 1.7 | d | 1.039 | 1.053 | 1.067 | 1.081 | 1.095 | 1.108 | 1.122 | 1.135 | 1.148 | 1.161 | 1.174 |
| 1.7 | R | 0.2054 | 0.2056 | 0.2059 | 0.2015 | 0.2019 | 0.2022 | 0.2025 | 0.2028 | 0.2031 | 0.2034 | 0.2036 |
| 1.7 | $\delta\lambda$ | 7.98 | 8.44 | 8.90 | 9.34 | 9.82 | 10.32 | 10.84 | 11.36 | 11.90 | 12.44 | 13.00 |
| 1.7 | $d\lambda$ | 4.19 | 4.43 | 4.67 | 4.92 | 5.18 | 5.44 | 5.71 | 5.98 | 6.26 | 6.55 | 6.85 |
| 1.9 | d | 0.982 | 0.996 | 1.009 | 1.022 | 1.035 | 1.048 | 1.061 | 1.074 | 1.086 | 1.098 | 1.110 |
| 1.9 | R | 0.2054 | 0.2056 | 0.2059 | 0.2015 | 0.2019 | 0.2022 | 0.2025 | 0.2028 | 0.2031 | 0.2034 | 0.2036 |
| 1.9 | $\delta\lambda$ | 7.14 | 7.54 | 7.96 | 8.36 | 8.80 | 9.24 | 9.70 | 10.16 | 10.64 | 11.14 | 11.64 |
| 1.9 | $d\lambda$ | 3.75 | 3.96 | 4.18 | 4.40 | 4.63 | 4.87 | 5.11 | 5.35 | 5.60 | 5.86 | 6.13 |

The Table B also shows grating reflectivities R and reflection bandwidths $\delta\lambda$ for gratings with length D of 8 μm in two media whose refractive indexes n are 1.7 and 1.9. The grating reflectivity (diffraction efficiency) $\eta$ and reflection bandwidth $\delta\lambda$ are calculated by the equation (1). The reflection bandwidth $\delta\lambda$ is defined as full width of the wavelength range beyond which the beam reflectivity is below 1%. d, R, $\delta\lambda$ and d$\lambda$ in different rows are correspondent with different refractive indexes n. d, R, $\delta\lambda$ and d$\lambda$ in different columns are correspondent with different wavelengths $\lambda$ and $\eta_I$. $\eta_I$ is the index modulation amplitude. d and D are measured in μm, $\delta\lambda$ and d$\lambda$ are measured in nm.

In the table B, d$\lambda$ is full width at half maximum (FWHM) of each read beam spectral distribution. d$\lambda$ is calculated by coherence length $l_C$ expression [A. F. Fercher, W. Drexler, C. K. Hitzenberger and T. Lasser, "Optical coherence tomography-principles and applications," Rep. Prog. Phys. Vol. 66. pp. 239-303, 2003].

$$l_C = \frac{2\ln 2}{\pi} \frac{\lambda_0^2}{nd\lambda}, \tag{8}$$

where $\lambda_0$ is the central wavelength and n is the medium refractive index. In calculations, $l_C$=8 μm, which is a little longer than the storage cell length. Therefore, since $\delta\lambda$>d$\lambda$, each read beam may be selectively reflected by only one matched grating in every storage cell, although they have broad bandwidths. In fact, $l_C$ may be taken as several times the storage cell length to offer better wavelength selectivity for detection beams with a little high crosstalk noise.

In the Table B, one can also see that when $\eta_I$ is from 0.0048 to 0.0089, $\lambda$ is from 250 nm to 460 nm and n is 1.7 or 1.9, the reflectivities of the gratings of 8 μm are over 20%, and their reflection bandwidths are from 3.44 nm to 13.0 nm, respectively. The reflectivity of 20% is enough for generating more than 5 reflected intensity levels (see further discussions below). The reflection bandwidths of from 3.44 nm to 13.0 nm permit more than 58 or 65 gratings overlapped in one storage cell (also see further discussions below).

In each beam group, the beam with longest wavelength will determine the length and diameter of the storage cell and so the storage layer thickness $\Delta H_E$. In the disk, the data are recorded in tracks. Thus, the area storing a data group is $\Delta S=(d+h)^2$, where h is the land width, and d is the groove width determined by the largest diameter of the write beam focus depths. The storage cell volume is $\Delta S \times \Delta H_E$. As mentioned above, when a beam group has $N_W$ beams, and each of these beams has $N_P$ possible polarizations and $N_I$ possible intensities, this beam group can provide $(N_P \times N_I)^{N_W}$ composite states for encoding the data. In the two-dimensional storage media, the data are stored in a plane and in binary numerical form, and if an area $\Delta S$ has a storage capacity of m-bits, that area can provide $2^m$ different states to store the data.

For any two data storage systems, if they can provide same number of distinct physical states, such as the stable states of a flip-flop, the voltage or current levels, the light intensities or wavelengths, the magnetization directions, the light polarization directions and so on, to store the data, these two systems have equal storage capacity. Therefore, when one system utilizing multi-wavelength, multi-polarization and multi-intensity and another utilizing one wavelength and two intensities (zero and non-zero, which forms the binary numeral system) have same distinct states for storing the data, they should have equal storage capacity. Thus, from $$2^m = (N_P \times N_I)^{N_W}, \tag{9}$$

one has $$m = \log_2[(N_P \times N_I)^{N_W}]. \tag{10}$$

In the equation (10), m is counted by binary numerical unit bit.

Consider a DVD size disk. Its diameter is 120 mm with a hub of 40 mm at the center. Its thickness is 1.2 mm, so the thickness $\Gamma$ of the storage medium may be 1.1 mm. Therefore, its maximum storage area S and volume V are $S=\pi(60^2-20^2)$ mm$^2$ and V=1.1S mm$^3$. The storage cell volume is $\Delta S \times \Delta H_E$. If the longest grating length in the storage cell is $D_m$, then $\Delta H_E = D_m$. If the thickness of added spacing between two adjacent storage layers is $\Delta\Lambda$, then every storage layer thickness becomes $\Delta H_{ER} = D_m + \Delta\Lambda$. The storage capacity $\Delta C$ of each storage layer is $$\Delta C = m \times \left(\frac{S}{\Delta S}\right). \tag{11}$$

The storage capacity $C_{SD}$ of a DVD sized disk is $$C_{SD} = \Delta C \left(\frac{\Gamma}{D_m + \Delta\Lambda}\right), \tag{12}$$

For the disk which has the same diameter and central hub as DVD and thicker thickness, it storage capacity can be calculated by the equation (12) with taking increased thickness as $\Gamma$.

TABLE C

Storage Capacities of Six-dimensional Optical Storage Disks

| n | 1.7 | 1.7 | 1.7 | 1.9 | 1.9 | 1.9 |
|---|---|---|---|---|---|---|
| $N_I$ | 2 | 2 | 2 | 2 | 2 | 2 |
| $N_P$ | 3 | 3 | 3 | 3 | 3 | 3 |
| $N_W$ | 58 | 58 | 58 | 65 | 65 | 65 |
|  | $C_{SD}$ | $C_{S2}$ | $C_{S3}$ | $C_{SD}$ | $C_{S2}$ | $C_{S3}$ |
|  | 15.37 | 27.95 | 41.92 | 19.16 | 34.84 | 52.27 |
| n | 1.7 | 1.7 | 1.7 | 1.9 | 1.9 | 1.9 |
| $N_I$ | 5 | 5 | 5 | 5 | 5 | 5 |
| $N_P$ | 9 | 9 | 9 | 9 | 9 | 9 |
| $N_W$ | 58 | 58 | 58 | 65 | 65 | 65 |
|  | $C_{SD}$ | $C_{S2}$ | $C_{S3}$ | $C_{SD}$ | $C_{S2}$ | $C_{S3}$ |
|  | 32.66 | 59.38 | 89.07 | 40.72 | 74.03 | 111.0 |
| n | 1.7 | 1.7 | 1.7 | 1.9 | 1.9 | 1.9 |
| $N_I$ | 10 | 10 | 10 | 10 | 10 | 10 |
| $N_P$ | 16 | 16 | 16 | 16 | 16 | 16 |
| $N_W$ | 58 | 58 | 58 | 65 | 65 | 65 |
|  | $C_{SD}$ | $C_{S2}$ | $C_{S3}$ | $C_{SD}$ | $C_{S2}$ | $C_{S3}$ |
|  | 43.54 | 79.17 | 118.8 | 54.28 | 98.70 | 148.0 |

The Table C shows the storage capacities of the DVD sized disk and two thicker ones. In the calculations, $D_m$=8 μm, h=50 nm, and $\Delta\Lambda$=1 μm. n is the medium refractive index. The longest wavelength $\lambda_m$ of the write beams is 460 nm. $N_I$ and $N_P$ are taken as 2 and 3, or 5 and 9, respectively. In addition, $N_I$ and $N_P$ are taken as 10 and 16 for reference to see possible potential. $N_W$ is calculated by $$N_W = 2 \sum_i \frac{\Delta\lambda}{\delta\lambda_{mi}} (i = 1, 2, 3, \ldots, 21),$$

where $\delta\lambda_{mi}$ is the widest reflection bandwidth of the gratings whose written wavelengths are in one of 21 divided ranges. Each divided range width $\Delta\lambda$ is 10 nm, and the total range is from 460 nm to 250 nm. The $\delta\lambda_{mi}$ values are taken from the Table B (that is, $\delta\lambda$ there). $C_{SD}$ is the storage capacity per DVD sized disk. $C_{S2}$ and $C_{S3}$ are storage capacities of the disks which have same diameters and central hubs as the DVD, but their storage medium thicknesses are 2 mm and 3 mm, respectively. $C_{S2}$ and $C_{S3}$ values are for reference to see possible potential too. The capacities $C_{SD}$, $C_{S2}$ and $C_{S3}$ are counted in Tbyte (1 Tbyte=8 Tbits). One can see that six-dimensional storage system has very large storage capacity. The storage capacity of a DVD sized disk can reach 32.66 Tbytes when $N_I$=5 and $N_P$=9, and 15.37 Tbytes even when $N_I$=2 and $N_P$=3. When every write beam has more polarizations and/or more intensities, the capacity will be larger. For example, when $N_I$=10 and $N_P$=16, the storage capacity of a DVD sized disk can reach 43.54 Tbytes. Furthermore, if the storage medium has higher refractive index, the storage capacities will be larger too.

This system has ultrafast data transfer rates because the data are written, erased and read by multiple beams simultaneously. In the disk whose capacity is 32.66 Tbytes, the capacity of one storage cell is 318.53 bits based on the equation (10), and the diameter of a storage cell is 1.174 μm. When the disk of 120 mm rotates at 5400 rpm or 15000 rpm, the shortest time for flying over a storage cell is 34.6 ns or 12.5 ns, respectively. Therefore, the read speed can go up to 9.21 Gbits/s or 25.57 Gbits/s. The read speed will be higher for faster disk rotation rates.

As mentioned above, the switch speeds of the beam wavelengths, polarizations and intensities may go up to a nanosecond, thus, the data write and erase speeds mainly depend on the medium birefringence change time under two-photon excitation. In azo-dye bearing polyimide film, the required effective illumination period for inducing birefringence change is 42.5 ns under the excitation intensity of over 71 W/μm² (see above description). Since 318.53 bits may be written into a storage cell during 42.5 ns when write power is over 71 W, the write and also the erase speeds of 7.49≈8 Gbits/s can be achieved. The write and erase speeds will be higher for the storage media with larger two-photon absorption cross-sections.

The Table B and C also show that when the storage medium responds to shorter two-photon absorption wavelengths, the system storage capacity and data transfer speeds will increase further. In the above calculations, the chosen storage medium is just for initially technology demonstration. Since the corresponding single-photon absorption range of the azo-dye bearing polyimide film ends around 480 nm, the available number of the volume gratings in each storage cell is less, which limits the storage capacity. Many materials exhibit shorter two-photon absorption ranges, which corresponding single-photon absorption ranges are down to ~200 nm [A. Dragonmir, J. G. McInerney and D. N. Nikogosyan, "Femtosecond measurements of two-photon absorption coefficients at λ=264 nm in glasses, crystals, and liquids," Appl. Opt. Vol. 41, pp. 4365-4376, 2002]. Therefore, if using the storage media with shorter absorption ranges, the system performance will be advanced. For example, if choosing a medium which corresponding single-photon absorption range is from 400 nm to 200 nm, and taking the storage cell length D=5 μm, when the medium refractive index n=1.7 or n=1.9, the capacities per DVD size disk will increase to 304.1 Tbytes or 377.2 Tbytes for $N_I$=5 and $N_P$=9, and 405.5 Tbytes or 502.9 Tbytes for $N_I$=10 and $N_P$=16. The capacity of a 2 to 3 mm thick disk will over 1 Pbyte. For a disk which capacity is 405.5 Tbytes, the read speed will exceed 99 Gbits/s.

Because of two-photon write and erase, the range $\Delta\lambda_W$ of the write/erase beams are far from the medium absorption range and the created grating resonant range (both equal $\Delta\lambda'_R$). Thus, the write/erase beams don't interact with the storage medium and created gratings outside their focus depths, resulting in almost no crosstalk among different storage layers during data write and erase. By two-photon absorption, data have been successfully recorded in 200 layers in a 1 mm thick disk with layer thickness of 5 μm and bit lateral interval of about 0.5 μm center to center, and the layer number and bit density in each layer may be increased further since the researchers promised 10 times storage capacity (10 Tbytes) for same size disk [E. Walker and P. Rentzepis, "Two photon technology: a new dimension," Nature Photonics Vol. 7, pp. 406-408, 2008]. Here, in the investigated system, the data are recorded in only 122 layers in the 1.1 mm thick disk with thicker layer thickness of 9 μm and wider cell lateral interval of ~1.2 μm center to center. The fewer layers and lower data bit (cell) density in each layer will produce lower crosstalk noise, which will not hinder the data write and erase in the investigated disk.

When reading data, each created grating is detected by TDOCT. Z. Yaqoob, J. Wu and C. Yang once described the property of TDOCT concisely [Z. Yaqoob, J. Wu and C. Yang, "Spectral domain optical coherence tomography: a better OCT imaging strategy," Bio. Techniques Vol. 39, pp. S6-S13, 2005]. If the collected reference and sample powers at wavelength k are $P_R(k)$ and $P_S(k)$, and $z_R-z_S$ is the path difference between two arms, the total power at interferometer exit (the splitter 32 exit, here) is $$P_{exit} = P_R(k) + P_S(k) + 2\sqrt{P_R P_S}\, \text{sinc}\left[\frac{\pi(z_R - z_S)}{l_C}\right]\cos[k_0 2(z_R - z_0)]. \quad (13)$$

Where k is the wavenumber, $l_C$ is the coherence length. $k_0$ is the mean wavenumber in the spectral bandwidth $\Delta k$ (in wavenumber) of the detection beam. The last interference term peaks when $z_R-z_S=0$, and drops rapidly when $z_R-z_S>l_C$.

In a normal TDOCT system, the reference arm moves over a distance equal to the total probing depth $z_{probing}$ (the total storage medium thickness here). In the total scan duration T, the system just spends a period of $$\frac{l_C}{z_{probing}} T$$

to collect interference signal from an interface (a volumetric layer here). By calculating interference signal photon number $N_{Signal}$ collected within T, and noise photon number $N_{Noise}$, which is given by the square root of the total photons received by photo detector within T (considering that the reference power dominates over all other signals), Z. Yaqoob and et al gave the signal-to-noise ratio (SNR) as $$SNR = 10\, \log\left(\frac{N_{Signal}}{N_{Noise}}\right)^2 = 10\, \log\left[4P_S \frac{l_C T \varepsilon}{z_{probing} h\nu}\right]. \quad (14)$$

Where ε is the quantum efficiency of the photo detector and h ν is the photon quantum energy, the unit of SNR is dB.

Each detection beam is cone beam. In most cases, the detection beam will pass many storage layers, and meet many gratings in each storage layer on the way to and from the desired storage cell, resulting in crosstalk noise and detection power attenuation. The crosstalk noise photons and interested signal photons will travel along different directions and through different distances to photo detector, so most of the noise photons will be blocked by coherence gating and confocal filtering. As both numbers of the layers and the gratings encountered by the detected beam in each layer are large, the chance of meeting matched gratings at each layer and so the power attenuation of the detection beam may be estimated based on average probability. First, for simplifying the analysis, supposing every storage cell has a wavelength matched grating. The average reflectivity of the gratings is 10% as the maximum reflectivity of 20% and if the reflectivity intervals for 2, or 5, or 10 levels are selected properly. The grating cross-section is round, so in an area $\sigma S$ the maximum area $\sigma S_g$ occupied by the gratings is $$\sigma S_g = \frac{\pi r^2}{4r^2}\sigma S,$$

where r is the grating cross-section radius. In addition, supposing the average chance of meeting polarization matched gratings is 50% because there are always two orthogonal polarized beams having same wavelength.

Except for several storage layers near the focus, the beam enters most encountered gratings obliquely. The slanted incidence will reduce the grating reflectivity. From the viewpoint of light diffraction, the reflection from a cylindrical volume grating may be regarded as the diffraction of a beam passing a circular aperture with a diameter of d. Because of Fraunhofer diffraction, the diffraction intensity $I_{\theta'\alpha'}$ of a circular aperture is [A. S. Marathay, in Handbook of Optics, M. Bass, E. W. V. Stryland, D. R. Williams and W. L. Wolfe, Eds., McGraw-Hill, New York, Vol. I, 3.22-3.24, 1995].

$$I_{\theta'\alpha'} = I_0\left(\frac{\sin\psi}{\psi}\right)^2 \text{ and} \tag{15}$$

$$\psi = \frac{\pi d n \rho}{\lambda}, \tag{16}$$

where $I_0$ is the light intensity on axis of the circular aperture, n is the medium refractive index, $\lambda$ is the beam wavelength, and $\rho=\sqrt{p^2+q^2}$. $p=\sin\theta'$ and $q=\sin\alpha'$ are the direction sines of the vector joining the center of the aperture to the point of the observation. When a Gaussian laser beam is converged by a lens, its angular divergence $\theta'$ is given by [W. T. Silfvast, in Handbook of Optics, M. Bass, E. W. V. Stryland, D. R. Williams and W. L. Wolfe, Eds., McGraw-Hill, New York, Vol. I, 11.23-11.24, 1995].

$$\theta' = \frac{4\lambda}{n\pi d}, \tag{17}$$

where d is the minimum beam waist diameter. When $\lambda$=460 nm, n=1.7 and d=1.174 μm, $\theta'$=16.8°. Taking $\theta'$ and $-\alpha'$ as 16°, 13°, 10°, 7°, 4° and 1°, $I_{\theta'\alpha'}$ equals to 0.024 $I_0$, 0.046 $I_0$, 0.004 $I_0$, 0.092 $I_0$, 0.525 $I_0$ and 0.963 $I_0$, respectively. It means that the reflectivity of a cylindrical volume grating will decrease when the reflective angle increases. For the grating of 8 μm long and 1.174 μm thick, when the reflective angle is larger than 7°, the reflectivity will fall below one tenth of the maximum. From solid angle equation $\Omega=2\pi(1-\cos\theta')$, one has $\Omega(\theta'=16.8°)$=0.268 and $\Omega(\theta'=7°)$=0.046. It means that the reflectivities of more than 80% matched gratings encountered by the detection beam at most volumetric layers are less than 10% of their normal incidence reflectivity. Thus, even supposing the reflectivities of all gratings within the solid angle $\Omega(\theta'=7°)$ are not reduced, and those of all gratings outside $\Omega(\theta'=7°)$ are 10% of their maximum reflectivities, the maximum influence factor for slanted incidence for most volumetric layers is less than 0.2+0.8×0.1=0.28. Therefore, averagely speaking, the maximum average power attenuation rate for each layer is $$\frac{\pi}{4} \times 0.1 \times 0.5 \times 0.28 = 0.011.$$

At last, supposing the detected grating locates at the bottom layer of the disk, which has an average reflectivity of 0.1, thus, when the detection beam returned to the interferometer exit, its remained power percentage after passing 244 layers is $0.1\times(1-0.011)^{244}$=0.67%.

Here, the investigated system is a little different from the normal TDOCT system. During each short duration T, the reference arm doesn't move, and the system only detects (scans) one volumetric layer, thus $z_{probing}=\Delta H_E$. If taking initial detection beam power as 100 mW (100 mW is also the peak power since the read beams are continuous waves, which can't induce medium birefringence change), the collected signal power $P_S$ from the farthest data layer is 0.67 mW. The quantum efficiency of the photo detector is normally form 60% to 90%, so $\epsilon$ may be taken as 75%. Then, by making $l_C \cong \Delta H_E$, T=10 ns and $\lambda_0$=460 nm, the signal-to-noise ratio for detecting a grating (whose two-photon write beam wavelength is 460 nm) locating at the bottom layer can be calculated by equation (14). It is 76.68 dB, which equals a ratio (amplitude) of the received interference signal photons to the noise photons of $6.82\times10^3$. In other words, the system is sensitive to a grating that only reflects 1 part in more than $10^7$ of the detection beam light (power). Such SNR is much higher than the required one for identifying 10 intensity levels. Furthermore, if considering that the noise photons are also filtered by the confocal microscopic detections, the practical SNR should be higher further than the calculated one. The polarization detections are intensity differential detections, which just care the intensity difference. Because two orthogonal read beams having a same wavelength are reflected from a same grating, and pass through a same path, so their intensity variations caused by various reasons during their traveling ways are almost same. Thus, the intensity difference between these two orthogonal beams will be almost only determined by the grating polarization direction, which will make the polarization detections have better resolutions than the intensity detections. In addition, the polarization detections are independent of the intensity detections because each returned detection beam is split into two un-relevant parts before the polarization and intensity measurements.

Because spectral absorption response of the storage medium is not uniform in the write beam wavelength range. the reflectivity R of the created grating will shift with the wavelength, that is, R will become the function of the wavelength $\lambda$, and R($\lambda$) is probably different for different disks. This problem can be solved by setting up a "spectral response referring" storage cell in each disk, and using it to compute R($\lambda$). This "spectral response referring" storage cell is created by a special beam group. This beam group has all wavelengths of the write beams. All beams in this group have a same specified polarization and a same allowable highest intensity (not damaging the storage medium). Then reading this "spectral response referring" storage cell and measuring the intensities and wavelengths of the beams reflected from this cell. Regarding the highest received intensity as one with reflectivity of 100% no matter how much its real value is, then the reflectivity decline ratio of every beam with different wavelength may be determined by comparing that received intensity with the highest received one. Then, the received intensities of the beams reflected from other storage cells in the same disk may be divided by these decline ratios according to their wavelengths to correct the spectral response influence of the disk storage medium.

Because of various reasons, such as power attenuation difference among different layer depths, disk surface stains and so on, the reflectivities of the created gratings in the different storage cells created by same write intensity may be different. If these differences are large, they will cause error-read. This problem can be solved by creating a special "referring" volume Bragg grating in every storage cell. This "referring" grating is created by using a special write beam, which has a specified wavelength, a specified polarization and an allowable highest intensity. When the detection beam group reflected from each storage cell is received, the highest intensity with the said specified polarization is always regarded as the intensity level of "1", no matter how much its real value is. Because every other received intensity is equal to or below it and has a particular ratio compared with it, that ratio can be regarded as the intensity level of every other received intensity. The size of every storage cell is small, so the reflectivity changes of any two gratings in a same storage cell caused by a same external influence should be same in most cases.

The above described embodiments of the apparatus may be modified or improved further by combining the existing technical knowledge with the invented method or designed structure described above. For example, adding one or even more than one physical dimension(s) further to the said six-dimensions is an obvious way, such as plus the proper photon angular momentum [N. Bozinovic, Y. Yue, Y. Ren, M. Tur, P. Kristensen, et al, "Terabit-scale orbital angular momentum mode division multiplexing in fibers," Science Vol. 340, pp. 1545-1548, 2013] to build a seven-dimensional storage system. Following the deduction way shown by the Table A, the storage cell capacity of such a seven-dimensional system may be roughly calculated.

Supposing there are $N_A$ beam groups with $N_A$ different photon angular momentums. In each beam group, there are $N_W$ beams with different wavelengths and a same photon angular momentum, and each beam also has $N_P$ possible polarizations and $N_I$ possible intensities. Then, the storage capacity of a storage cell written by these $N_A$ beam groups is determined by the value of $(N_P N_I)^{N_W N_A}$. If still choosing a medium which corresponding single-photon absorption range is from 400 nm to 200 nm, and still taking the storage cell length D=5 μm, when the medium refractive index n=1.7 or n=1.9, the corresponding capacities per DVD size disk will be 608.3 Tbytes or 754.4 Tbytes for $N_A$=2, $N_I$=5 and $N_P$=9, and 811.0 Tbytes or 1006 Tbytes for $N_A$=2, $N_I$=10 and $N_P$=16. For a disk which capacity is 811.0 Tbytes, the read speed will exceed 198 Gbits/s.

Another obvious, possible and efficacious way to advance the system performance is to combine the mentioned super resolution writing with the described six-dimensional or even seven-dimensional storage. The super resolution writing is utilizing two beams which focal depths are concentric and overlapped. One beam has a Gaussian shape, and another has a ring shape with a zero intensity center. Through the collaborative interactions with the storage medium, the effective diameter of the focal depth of the Gaussian beam will be reduced to much smaller than its diffraction limited size. Therefore, for example, if the storage cell diameter can be decreased to one third of its diffraction limited size (meanwhile, keeping the storage cell length unchanged), the disk storage density will be increased tenfold approximately. Thus, the storage capacity per DVD size disk of the six- or seven-dimensional system will be increased tenfold too, that is, to 3 Pbytes to 10 Pbytes with faster data transfer rates.

I claim:

1. An optical six-dimensional data storage method, the method comprises: using N, where N is an integer greater than 1, linearly polarized light beams with different wavelengths, encoded intensities and encoded polarizations to form a group of multiple standing waves overlapped in the medium; forming multiple plane volume gratings in a small volume in the medium as a storage cell for data through two-photon absorption; later illuminating the storage cell using multiple linearly polarized or unpolarized light beams to produce a group of reflected beams with matched wavelengths, corresponding intensities and particular polarizations with respect to said group of multiple standing waves; utilizing at least one of optical coherence tomography or confocal microscopy or both of optical coherence tomography and confocal microscopy to receive the group of the reflected beams from the storage cell; at last decoding the group of the reflected beams from the storage cell back to the data originally stored.

2. The optical six-dimensional data storage method of claim 1, wherein said N is equal to 30 or greater; wherein said different wavelengths are in the visible range, near infrared range, or ultraviolet range.

3. The optical six-dimensional data storage method of claim 1, wherein said different wavelengths, encoded intensities and encoded polarizations mean that during each short period, values of the wavelengths, polarizations and intensities of the N beams correspond with a certain data according to a color-brightness and polarization direction encoding regulation which is predetermined in such a way that each possible composite state of the wavelengths, polarization directions and intensities of the N beams is defined to correspond with one of basic symbols of a suitable digital encoding scheme to make any data group be represented by a group of the composite states of the wavelengths, polarization directions and intensities of the N beams.

4. The optical six-dimensional data storage method of claim 1, wherein a small mirror is placed under the medium to reflect the N beams perpendicularly back into the medium to interfere with subsequently incident beams to form said group of multiple standing waves overlapped in the medium.

5. The optical six-dimensional data storage method of claim 1, wherein said medium is a photorefractive and polarization-sensitive material which is excited by two-photon absorption, that is, a material which refractive index and polarization characteristics are changed through two-photon absorption including two-photon absorption induced and writing power dependent birefringence change.

6. The optical six-dimensional data storage method of claim 1, wherein each of said multiple plane volume gratings is a resonant grating which is formed in each focus depth of N beams at a frequency which is double each frequency of the N beams.

7. The optical six-dimensional data storage method of claim 1, wherein said utilizing at least one of optical coherence tomography or confocal microscopy or both of optical coherence tomography and confocal microscopy to receive the group of the reflected beams from the storage cell comprises utilizing optical coherence tomography or confocal microscopy individually, or utilizing both of optical coherence tomography and confocal microscopy simultaneously to selectively receive the reflected beams from the desired storage cell to restrain interlayer crosstalk noise.

8. The optical six-dimensional data storage method of claim 3, wherein said decoding is based on a reverse regulation of the said color-brightness and polarization direction encoding regulation.

9. The optical six-dimensional data storage method of claim 1, wherein said N linearly polarized light beams have the same or different photon angular momentums, and wherein said medium is sensitive to different photon angular momentums.

10. The optical six-dimensional data storage method of claim 1, wherein at least one plane volume grating diameter is decreased by super resolution writing including by utilizing two beams: one beam having a Gaussian shape and another beam having a ring shape with a zero intensity center, said two beams are arranged concentrically and overlapped to reduce effective diameter of focal depth of the Gaussian shaped beam.

11. An optical storage apparatus, the apparatus comprises: a one layer or multilayer photorefractive, polarization-sensitive medium having data stored by excitation by two-photon absorption in storage cells located in concentrically circular or spiral tracks; laser arrays and superluminescent diode arrays generating multiple linearly polarized beams or multiple linearly polarized and unpolarized beams with different wavelengths, said multiple linearly polarized beams or multiple linearly polarized and unpolarized beams are arranged to be collinear, concentric and focused with available smallest diameters of focal depths to write data to, read data from and erase data in said storage cells; an electronic processor to encode each composite state of wavelengths, intensities and polarization directions of said multiple linearly polarized beams during each short period to correspond to each data stored in each of said storage cells according to a color-brightness and polarization direction encoding regulation; photosensor arrays for measuring intensities and polarization directions of beams reflected from desired storage cell during each short period; and an electronic processor for decoding the composite state of the wavelengths, intensities and polarization directions of the beams reflected from desired storage cell to reproduce stored data according to a color-brightness and polarization direction decoding regulation; a means for making the available smallest diameters of focal depths of said multiple linearly polarized beams or multiple linearly polarized and unpolarized beams fall in a required data layer in the medium;
    a means for tracking to center the multiple linearly polarized beams or multiple linearly polarized and unpolarized light beam spots on a circular or spiral track; a means for receiving the reflected beams from said desired storage cell in a data layer.

12. The optical storage apparatus of claim 11, wherein said one layer or multilayer medium is a rotatable and either of a removable or non-removable optical disk which has a round plate shape including a shape and a size the same as that of a CD or DVD.

13. The optical storage apparatus of claim 12, in which the optical disk comprises a transparent substrate layer, one or multiple optical storage medium layers, a narrowband reflective filter layer, two transparent cover layers and the grooves which form the concentrically circular or spiral tracks.

14. The optical storage apparatus of claim 11, wherein said laser arrays generating multiple linearly polarized beams are M laser arrays, where M is equal to 2 or greater, or M multi-wavelength or frequency tunable lasers; each laser array of said laser arrays has the same number of lasers and beams generated from different laser arrays have different polarization directions.

15. The optical storage apparatus of claim 11, wherein said superluminescent diode arrays are 2 superluminescent diode arrays generating multiple linearly polarized beams with polarization directions that are perpendicular to each other, 2 superluminescent diode arrays having the same number of the superluminescent diodes; or 1 superluminescent diode array generating multiple unpolarized beams.

16. The optical storage apparatus of claim 11, wherein said means for making the available smallest diameters of said multiple linearly polarized beams or multiple linearly polarized and unpolarized beams focal depths fall in said required data layer in said medium is that an additional beam is used as an adjustment beam, said adjustment beam and said multiple linearly polarized beams or multiple linearly polarized and unpolarized beams are arranged to be collinear and concentric, and focus of said adjustment beam focus and smallest diameters of said multiple linearly polarized beams or multiple linearly polarized and unpolarized beam focal depths are arranged at different depths and with fixed intervals, said adjustment beam focus is kept on a groove surface by automatic focusing.

17. The optical storage apparatus of claim 11, wherein said means for tracking is that an adjustment beam for automatic focusing is used as a tracking adjustment beam also, said tracking adjustment beam and said multiple linearly polarized beams or multiple linearly polarized and unpolarized beams are arranged to be collinear and concentric, focus of said tracking adjustment beam is kept on a desired groove by automatic tracking.

18. The optical storage apparatus of claim 11, wherein said means for receiving the reflected beams from said storage cell in said desired data layer contains Michelson interferometer structures or confocal microscope structures or both of Michelson interferometer structures and confocal microscope structures; each Michelson interferometer structure consists of a detected grating as a sample arm, a shared moveable mirror as a reference arm and a shared beam splitter having a reflectivity for all read beam being 50%; each confocal microscope structure consists of a detected grating at focal plane of a reading lens, a corresponding measuring photosensor and a spatial pinhole before said corresponding measuring photosensor placed at the matched confocal plane.

19. The optical storage apparatus of claim 11, further comprising a means for making the apparatus compatible with CD and DVD disks using an adjustment beam for automatic focusing and automatic tracking also as a write, read and erase beam for CD or DVD disks, when a received adjustment beam light energy is higher or lower than a certain value, then the received light is represented as a "1" or "0.

\* \* \* \* \*